(12) United States Patent
Plummer et al.

(10) Patent No.: US 6,403,182 B1
(45) Date of Patent: Jun. 11, 2002

(54) THERMAL INSULATION SYSTEM

(75) Inventors: Sean Plummer, Gilbert; John King, Tempe, both of AZ (US)

(73) Assignee: Accessible Products, Co., Tempe, AZ (US)

(*) Notice: Subject to any disclaimer, the term of this patent is extended or adjusted under 35 U.S.C. 154(b) by 68 days.

(21) Appl. No.: 09/603,075

(22) Filed: Jun. 26, 2000

(51) Int. Cl.[7] .............................. B32B 3/28; F16L 9/14
(52) U.S. Cl. ...................... 428/36.9; 428/60; 428/61; 428/99; 138/151; 138/162; 138/156
(58) Field of Search ......................... 428/36.9, 57, 99, 428/60, 61; 138/149, 151, 162, 156, 157

(56) References Cited

U.S. PATENT DOCUMENTS

| | | | |
|---|---|---|---|
| 231,832 A | 8/1880 | Merriam | 138/149 |
| 3,204,668 A | 9/1965 | Emerson, Jr. et al. | 138/158 |
| 3,317,074 A | 5/1967 | Barker, Jr. et al. | 220/9 |
| 3,628,572 A | 12/1971 | Shannon | 138/161 |
| 4,221,239 A | 9/1980 | Reale | 138/149 |
| 4,287,245 A | 9/1981 | Kikuchi | 428/36 |
| 4,298,554 A | 11/1981 | Vogel et al. | 264/25 |
| 5,007,666 A * | 4/1991 | Kyfes | 138/162 |

* cited by examiner

Primary Examiner—Alexander S. Thomas
(74) Attorney, Agent, or Firm—Christie, Parker & Hale, LLP

(57) ABSTRACT

A thermal insulation system for insulating a pipe is disclosed having an upper insulation member engageable with a lower insulation member to collectively surround the pipe. Each of the upper and lower insulation members preferably have a plurality of constant radius relief cuts at each end thereof, wherein the constant radius relief cuts extend from the end of each of the insulation members toward the center of the insulation member. In a preferred embodiment, each insulation member further includes a plurality of radial relief cuts extending radially from the inner surface of each of the insulation members toward the outer surface of the insulation member. The radii of curvature of the insulation members is preferably variable such that, for a portion of the insulation member, a gap exists between the inner surface of the insulation member and the pipe, allowing room for fluctuation in the size and shape of the insulation members.

20 Claims, 3 Drawing Sheets

THERMAL INSULATION SYSTEM

BACKGROUND OF THE INVENTION

The present invention relates generally to thermal insulation systems for piping, and more particularly to a factory jacketed thermal pipe insulation having relief cuts therein to compensate for fluctuations in form resulting from varying environmental factors.

BACKGROUND OF THE INVENTION

Pipes that convey liquid or gaseous materials from one point to another often require insulation and protection from environmental elements such as heat and cold. Insulation is especially important in industrial and critical process applications. To protect against the elements, one option has been to provide piping with the insulation already installed thereon. Thus, piping and insulation are made available as a combined unit. The purchase of the pipe and insulation as a combined unit ensures that the insulation will fit the pipe perfectly. However, when the pipe needs repair or maintenance, the process of removing and replacing the insulation is difficult and time consuming.

To simplify the insulation process, a factory jacketed insulation system is available, separately from the pipes. The factory jacketed insulation system allows the user the option of the installation of a wider variety of piping of various construction and materials without the necessity of purchasing the piping and insulation as a combined unit. The factory jacketed insulation system includes a first semi-circular section that is dimensioned to mate with a second semi-circular section. The two semi-circular sections are permanently bonded to a single exterior jacket to complete the insulation system. The first and second sections have corresponding notches at the ends for easy fit and mating. The factory jacketed insulation system can be installed by simply pressing the first semi-circular section around half of the pipe and wrapping the second section over the remaining pipe thereby joining the first and second sections together. The factory-applied jacket allows for precision mating of the two insulation sections. There is no need to remove the pipe when installing the insulation. Furthermore, the pipe and the insulation need not be purchased together as a combined unit. The slide-over arrangement also allows for simplified testing of the installation for leakage and repair of the pipes.

The disadvantage of the factory jacketed insulation system is that the insulation material is sensitive to the moisture content in the ambient air. In a dry environment, the insulation material is at its smallest condition. When the humidity rises, the insulation material expands. A 30% rise in humidity could result in a 3% increase in the size of the material. The fluctuation in the size of the insulation material interferes with the fit around the pipe. The problem is magnified for larger pipes since there is an increase in the surface area.

This problem is illustrated in the manufacturing/sale scenario. The manufacturer, located in a first city, cuts the insulation to the customer's specifications. The insulation is then shipped to a second city having a different ambient air moisture level than the first city. When the insulation arrives at the second city, it will have fluctuated in size and will no longer fit around the pipe. The unsatisfied customer will undoubtedly complain to the manufacturer and return the insulation for evaluation. Upon arrival in the first city, the insulation will return to its original size, evading a negative analysis. The manufacturer is not able to respond to the customer's complaint.

The problem can arise even if the insulation is not shipped to another city. For instance, insulation that is cut in humid temperatures is swollen and contains water. Once the insulation is placed on a hot pipe, the water evaporates causing the insulation to shrink. If a jacket is placed around the insulation, the contraction of the insulation will cause the jacket to wrinkle.

Accordingly, there is a need for a thermal insulation system that is easy to install and accommodates fluctuation in size of the insulation resulting from changes in temperature and humidity.

SUMMARY OF THE INVENTION

The thermal insulation system of the present invention includes an upper insulation member engageable with a lower insulation member to collectively surround and insulate a pipe. The ends of the upper and lower insulation members are preferably configured to form shiplap joints when the insulation members are wrapped around the pipe and connected together. In a preferred embodiment, the first end of the upper insulation member preferably has a projection that is dimensioned to fit into a groove in the first end of the lower insulation member to form a shiplap joint. Similarly, the second end of the lower insulation member has a projection that is dimensioned to fit into a groove in the second end of the upper insulation member forming a second shiplap joint. The projections on the first end of the upper insulation member and the second end of the lower insulation member preferably have a dome-shaped cross-section and extend across the entire length of the upper and lower insulation members. Correspondingly, the grooves in the second end of the upper insulation member and in the first end of the lower insulation member have a dome-shaped cross section to accommodate the respective projections.

The upper and lower insulation members are preferably made of a flexible foam material and, more preferably, made of TECHLITE®, an open melamine foam. Foam material tends to fluctuate in size and shape depending on the environmental conditions. To compensate for the fluctuations in size and shape, relief cuts are made in the foam material to minimize the variance in the insulation. Specifically, a series of constant radius relief cuts are provided on the first and second ends of each of the insulation members. The cuts preferably extend from the ends of the insulation members toward the center portion. In a preferred embodiment, the radius of each of the cuts remains constant.

In addition to the constant radius relief cuts, radial relief cuts are made on the inner surface of the upper and lower insulation members. The cuts extend axially along the length of insulation members and radially advance from the inner surface toward the outer surface of each of the insulation members. In a preferred embodiment, three radial relief cuts are provided on each of the upper and lower insulation members. On each insulation member, one radial relief cut is preferably positioned at the center of the insulation member and the second and third radial relief cuts are provided on either side of the first radial relief cut, equidistant therefrom.

In a preferred embodiment of the present invention, the upper and lower insulation members are arc-shaped and the inner surface of the insulation members have variable radii of curvature. The radius of curvature at the center of the insulation members is preferably greater than the radius of curvature at the first and second ends of the insulation members such that a gap is created between the inner surface and the pipe at the center portion of each of the insulation member. The gap accommodates the variation in the size and shape of the insulation members resulting from varying environmental conditions. The various forms of relief cuts and gaps that accommodate size fluctuations allow the foam material of the insulation members to fluctuate while still preserving the connection at the shiplap joints of the insulation members and maintaining the fit of the insulation members around the pipe.

This invention, together with the additional features and advantages thereof, which was only summarized in the foregoing passages, will become more apparent to those of skill in the art upon reading the description of the preferred embodiments, which follows in the specification, taken together with the following drawings.

DETAILED DESCRIPTION OF THE INVENTION

The object of the present invention is to provide a thermal insulation system that is easy to install and that accommodates variations in the size of the insulation material resulting from varying environmental conditions.

Figure 1:
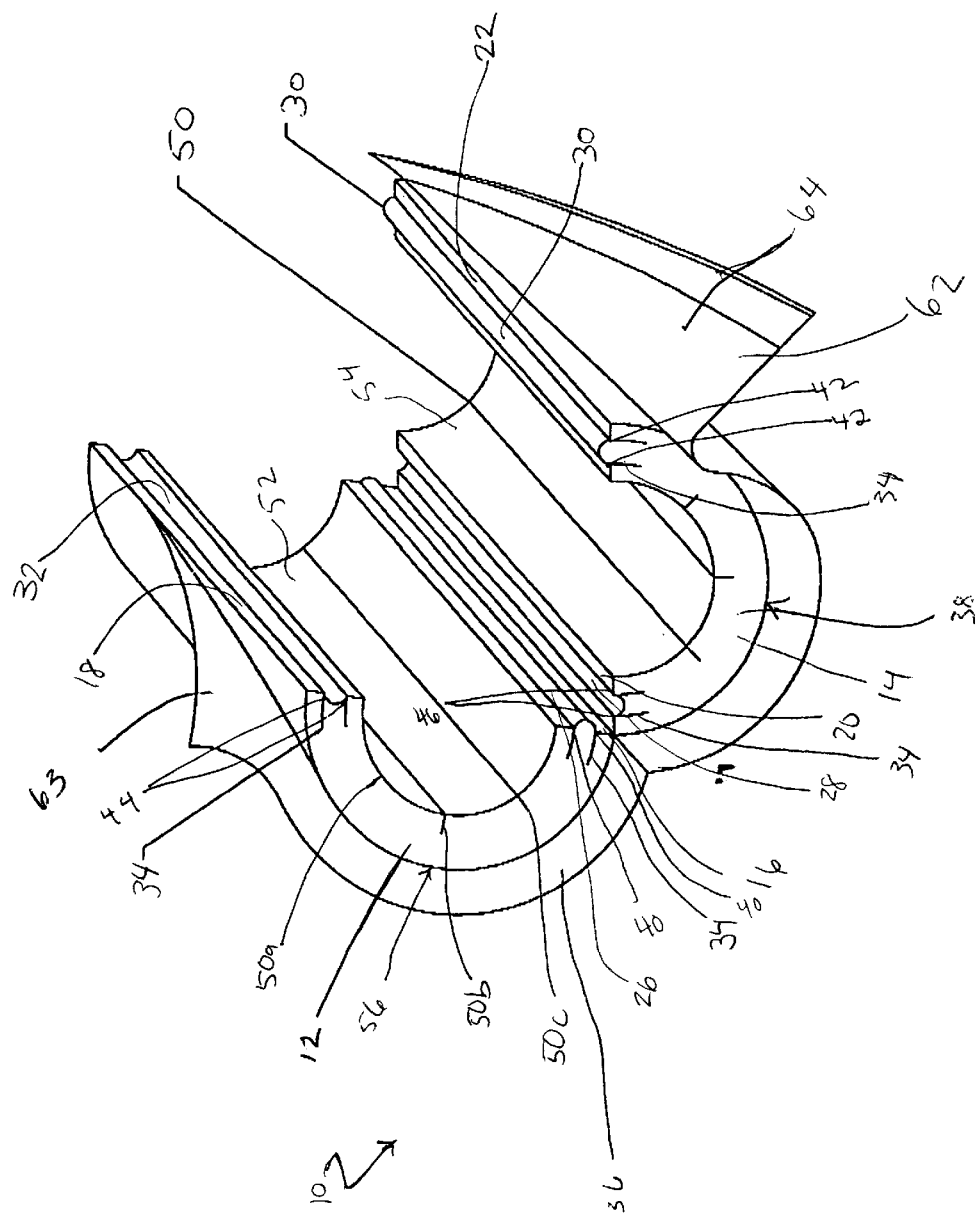
FIG. 1 is a perspective view of one embodiment of the thermal insulation system of the present invention.

As shown in FIG. 1, the thermal insulation system 10 of the present invention includes an upper insulation member 12 and a lower insulation member 14. The upper and lower insulation members 12, 14 are dimensioned to wrap around a pipe (not shown) and join each other forming a pair of shiplap joints 26, best shown in FIG. 3. Specifically, the first end 16 of the upper insulation member 12 preferably has a projection 26 that is dimensioned to fit into a groove 28 in the first end 20 of the lower insulation member 14. Similarly, the second end 22 of the lower insulation member 14 has a projection 30 that is dimensioned to fit into a groove 32 in the second end 18 of the upper insulation member 12. In the preferred embodiment of the invention, the projections 26 and 30 preferably have a dome-shaped cross-section. The insulation system is installed onto a pipe by covering half of the pipe with the upper insulation member 12 and the other half of the pipe with the lower insulation member 14 and coupling the members together forming the shiplap joints 26.

The shape of the upper and lower insulation members 12, 14 is not limited to a semi-circular shape. Rather, the upper and lower insulation members can have any arc shape as long the two members, when connected to each other, fully surround the pipe to be insulated. The upper and lower insulation members 12, 14 are made of insulative material to maintain the temperature of the pipes and protect the pipes from environmental elements. In the preferred embodiment, the members 12, 14 are made of TECHLITE®. TECHLITE® is a flexible foam produced from melamine resin, a thermoset of the amino-plastics group. TECHLITE® is a precision-machined and mechanical insulation system developed specifically as a lightweight non-fibrous alternative to conventional fibrous and elastomeric products. The benefits of TECHLITE® are that it has high temperature resistance, low bacterial growth, 25/50 fire rating and outstanding fabrication qualities. Accordingly, TECHLITE® is safe, durable, efficient, and relatively maintenance free. Melamine foam is manufactured and sold by BASF in Ludwig Shafer, Germany.

The problem with any insulative material, and particularly TECHLITE®, is that, as discussed above, it is sensitive to the moisture content in the ambient air and fluctuates in size and shape when exposed to varying temperatures and levels of humidity. If the insulation members 12, 14 are cut in humid conditions and then transferred to a dry area, the members will shrink and will no longer fit around the pipe. Similarly, insulation members that have swelled with moisture from the humidity of the ambient air will shrink from the heat emanating from the piping and will no longer fit around the piping.

Figure 2:
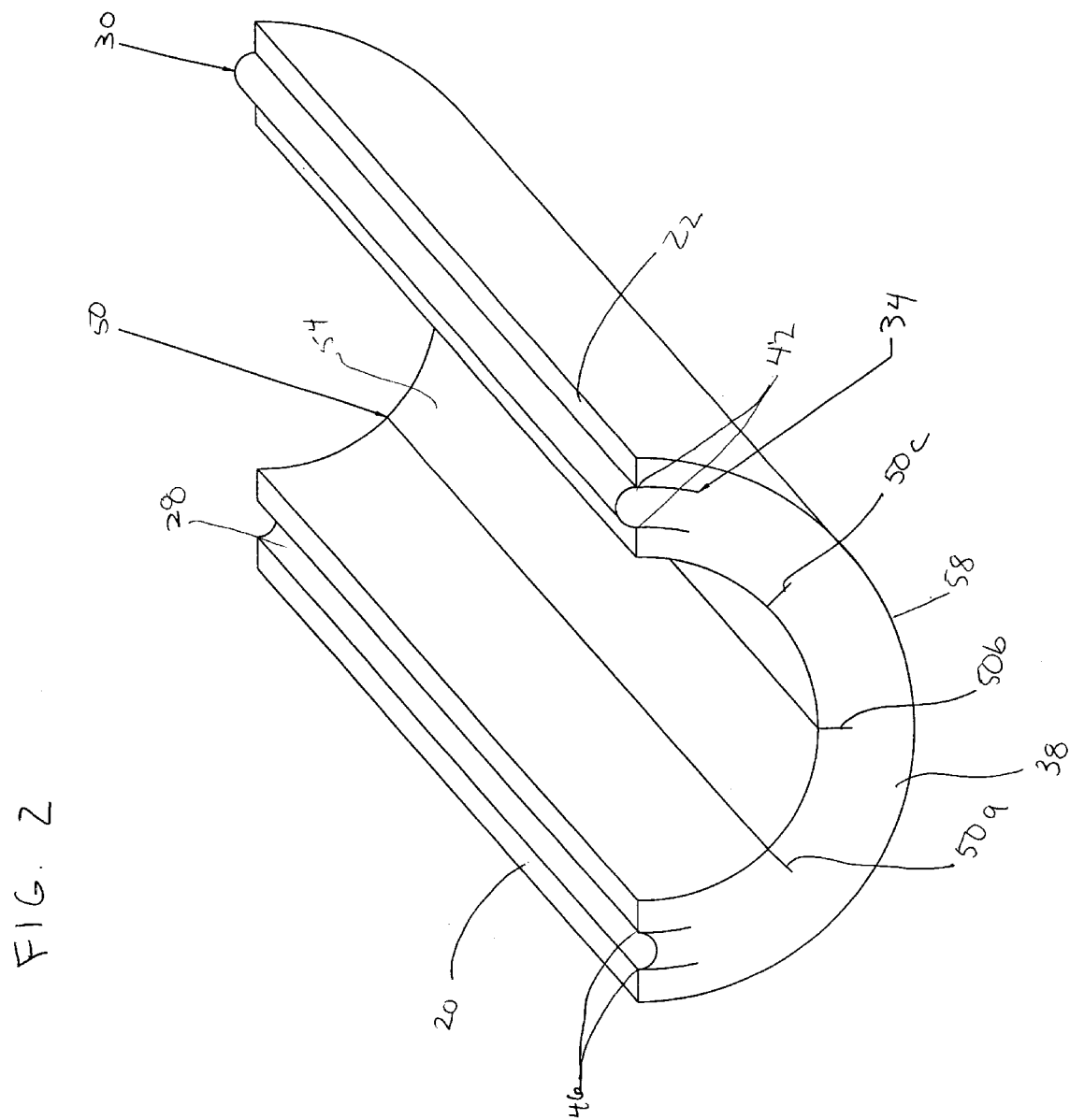
FIG. 2 is a perspective view of the lower insulation member of one embodiment of the thermal insulation system of the present invention.
Figure 3:
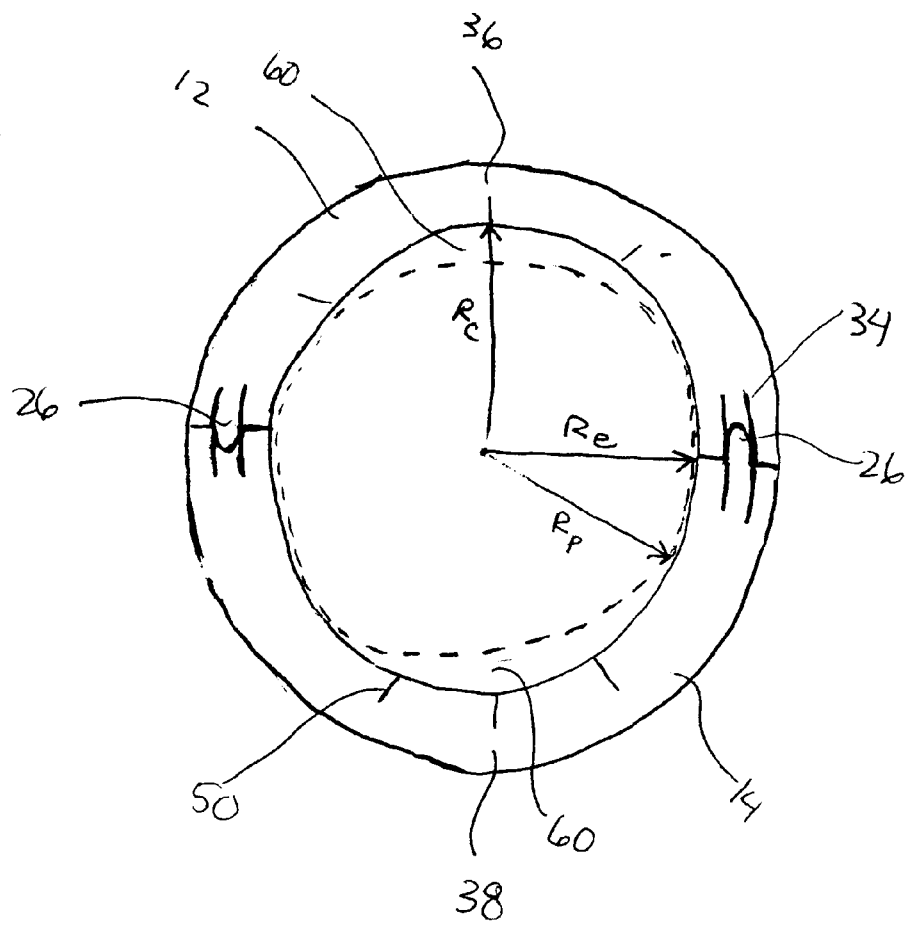
FIG. 3 is an end view of one embodiment of the thermal insulation system of the present invention.

The thermal insulation system of the present invention minimizes the fluctuation in shape and size of the insulation members by providing various relief cuts in the insulation members. Two types of relief cuts are shown in FIGS. 1 through 3. First, a series of constant radius relief cuts are made beginning in the first and second end of each insulation member. As described in more detail below, constant radius cuts 34 are made in the first end 20 and second end 22 of the lower insulation member 14. Similarly, constant radius cuts are made in the first end 16 and the second end 18 of the upper insulation member 12. The cuts 34 are radial and extend from the ends of the insulation members toward the center portion. The radius of curvature of each of the cuts 34 is preferably constant.

In a preferred embodiment, the upper insulation member 12 has a pair of constant radius relief cuts 34 in its first end 16. The cuts 34 in the first end 16 are radial and extend from the first end 16 of the upper insulation member 12 toward the center portion 36 of the upper insulation member 12. The pair of constant radius relief cuts 34 on the first end 16 of the upper insulation member 12 are preferably spaced apart, and more preferably, each cut 34 extends from an edge 40 of the dome-shaped projection 26 toward the center portion 36. Another pair of constant radius relief cuts 34 are preferably made in the second end 18 of the upper insulation member 12. The cuts 34 in the second end 18 of the upper insulation member 12 are preferably spaced apart and, more preferably, each cut 34 extends from an edge of the groove 32 in the second end 18 toward the center portion 36 of the upper insulation member 12. The number of cuts, the depth of each cut, and the space between the cuts depend upon the specific application, including factors such as the size of the pipe, size of the insulation, insulative material used, the environmental conditions, etc.

Similarly, in a preferred embodiment, the lower insulation member 14, as shown in FIGS. 1 and 2, has a pair of constant radius cuts 34 at its first end 20 and a pair of constant radius cuts 34 at its second end 22. The pair of constant radius relief cuts 34 on the first end 20 of the lower insulation member 14 are preferably spaced apart, and more preferably, each cut 34 extends from an edge 42 of the dome-shaped projection 30 toward the center portion 38 of the lower insulation member 24. The second pair of constant radius cuts 34, made in the second end 22 of the lower insulation member 14 are preferably spaced apart and more preferably, each cut 34 extends from an edge 46 of the groove 28 in the second end 20 toward the center portion 38 of the lower insulation member 14.

In addition to the constant radius relief cuts 34, radial relief cuts 50 are made on the inner surface 52 of the upper insulation member 12 and the inner surface 54 of the lower insulation member 14. The radial relief cuts 50 begin at the inner surfaces 52, 54 of the upper and lower insulation members, respectively, and advance toward the outer surfaces 56, 58 of the upper and lower insulation members 12, 14, respectively. The radial relief cuts 50 preferably do not reach the outer surfaces 56, 58 of the insulation members 12, 14. The length of the radial relief cuts 50 preferably extends across the entire length of the insulation member 12, 14. The depth of each cut, the number of the cuts, and the space between the cuts depend upon the specific application, including factors such as the size of the pipe, size of the insulation, insulative material used, and the environmental conditions. In a preferred embodiment of the present invention, three radial relief cuts 50 are made on each of the upper and lower insulation members 12, 14. A center relief cut 5b is preferably made in the center portion 36, 38 of each of the upper and lower insulation members 12, 14, respectively. Side radial relief cuts 50a and 50c are preferably made on either side of the center relief cut 50b and, more preferably, are equidistant from the center relief cut 50b.

The constant radius relief cuts 34 and the radial relief cuts 50 minimize the fluctuation in the shape and size of the insulation members resulting from a change in the moisture content of the ambient air by interrupting the path of the fluctuation. For example, if the insulation members are expanding as a result of an increase in humidity, the relief cuts 34, 50 are positioned in the expansion path and interrupt the growth of the insulation members. Accordingly, the insulation members are able to maintain substantially the same size.

As shown in FIG. 3, in a preferred embodiment of the present invention, the inner surfaces 52, 54 of the upper and lower insulation members, respectively, are arc-shaped. The radii of curvature of the inner surfaces 52, 54, preferably, are not constant. Rather, the radius of curvature at the center portion 36, 38, designated as Rc in FIG. 3, is greater than the radius of curvature at the ends 16, 18, 20, and 22 of the insulation members, designated as Re in FIG. 3. The radius of curvature at the ends 16, 18, 20 and 22, Re, is preferably equal to the radius of the pipe, designated as Rp in FIG. 3. Since Rc is greater than Rp, a gap 60 is created between the pipe and the insulation members 12, 14. The gap 60 further accommodates any expansion of the insulative material. Accordingly, when the upper or lower insulation members expand as a result of varying environmental conditions, the upper and lower members 12, 14 expand into the gap 60. This design allows for the thermal insulation system to be fitted around the pipe while still allowing some room for expansion of the insulative material.

In a preferred embodiment, the thermal insulation system 10 also includes a jacket 62, shown in FIG. 1. The jacket 62 is dimensioned to wrap around the upper and lower insulation members 12, 14. The jacket 62 is preferably attached to the insulation members by attaching the first end 63 of the jacket to one of the insulation members. In FIG. 1, the first end 63 of the jacket 62 is shown attached to the upper insulation member 12. The jacket wraps around both of the upper and lower insulation members 12, 14 after the insulation members have been installed on the pipe. A second end 64 of the jacket 62 is placed over the first end 63 of the jacket such that the second end 64 overlaps the first end 63. The second end 64 can be attached to the first end 64 using an adhesive or other fixing aids known in the art.

The jacket 62 is preferably made of a one-piece, continuous foil material. When there is a change in the shape or size of the insulation members, the jacket will bubble or otherwise deform. The deformation in the jacket allows a user to observe any change in the insulation members from the exterior of the thermal insulation system. In the conventional insulation systems, a factory jacketed jacket is used. The disadvantage of the factory jacketed system is that it does not allow the user to observe the fluctuations in the insulation from the exterior of the system. The one-piece jacket is an improvement over the prior insulation systems in that it deforms to alert the user of a change in the insulation members.

While the invention is disclosed in conjunction with specific embodiments thereof, it is to be evident that many alternatives, modifications, and variations will be apparent to those skilled in the art in light of the foregoing description. Accordingly, it is intended to embrace all such alternatives, modifications and variations as falling within the spirit and broad scope of the appended claims.

What is claimed is:

1. A thermal insulation system for insulating a pipe, comprising:

an upper insulation member having a first end, a second end and a center portion located between the first end and the second end;

a lower insulation member having a first end, a second end, and a center portion located between the first end and the second end, the lower insulation member engageable with the upper insulation member, wherein the upper and lower insulation members collectively surround the pipe when installed thereon; and at least one relief cut made along the center portion of one of the upper and lower insulation members.

2. An insulation system in accordance with claim 1, wherein the upper and lower insulation members form a pair of shiplap joints when engaged together.

3. An insulation system in accordance with claim 1, wherein:

the first end of the upper insulation member having a projection thereon and the second end of the upper insulation member defining a groove therein;

the first end of the lower insulation member defining a groove therein and the second end of the lower insulation member having a projection thereon; and the projection on the first end of the upper insulation member being engageable with the groove in the first end of the lower insulation member to form a first shiplap joint, and the groove in the second end of the upper insulation member engageable with the projection on the second end of the lower insulation member to form a second shiplap joint.

4. An insulation system in accordance with claim 3, comprising:

a first pair of constant radius relief cuts extending from the first end of the upper insulation member toward the center of the upper insulation member, wherein the cuts are spaced apart and each cut of the first pair of constant radius relief cuts extends from an edge of the projection on the upper insulation member;

a second pair of constant radius relief cuts extending from the second end of the upper insulation member toward the center of the upper insulation member, wherein the cuts are spaced apart and each cut of the second pair of constant radius relief cuts extends from an edge of the groove in the upper insulation member;

a third pair of constant radius relief cuts extending from the first end of the lower insulation member toward the center of the lower insulation member, wherein the cuts are spaced apart and each cut of the third pair of constant radius relief cut extends from an edge of the groove in the lower insulation member; and a fourth pair of constant radius relief cuts extending from the second end of the lower insulation member toward the center of the lower insulation member, wherein the cuts are spaced apart and each cut of the fourth pair of constant radius relief cuts extends from an edge of the projection on the lower insulation member.

5. An insulation system in accordance with claim 1 wherein the at least one relief cut comprises:

a first pair of constant radius relief cuts made in the first end of the upper insulation member wherein the first pair of constant radius relief cuts extend from the first end of the upper insulation member toward the center of the upper insulation member;

a second pair of constant radius relief cuts made in the second end of the upper insulation member wherein the second pair of constant radius relief cuts extend from the second end of the upper insulation member toward the center of the upper insulation member;

a third pair of constant radius relief cuts made in the first end of the lower insulation member wherein the third pair of constant radius relief cuts extend from the first end of the lower insulation member toward the center of the lower insulation member; and a fourth pair of constant radius relief cuts made in the second end of the lower insulation member wherein the fourth pair of constant radius relief cuts extend from the second end of the lower insulation member toward the center of the lower insulation member.

6. An insulation system in accordance with claim 1 wherein the upper and lower insulation members each have a semi-circular cross-section.

7. An insulation system in accordance with claim 1 wherein the upper and lower insulation members are made of a flexible foam material.

8. An insulation system in accordance with claim 1 wherein the upper and lower insulation members are made of a flexible foam.

9. An insulation system in accordance with claim 1 wherein:

the upper insulation surface comprises an inner surface, an outer surface, and an axial length;

the lower insulation member comprises an inner surface, an outer surface, and an axial length; and the at least one relief cut comprises a first radial relief cut extending radially from the inner surface of the upper insulation member toward the outer surface of the upper insulation member and a second radial relief cut extending radially from the inner surface of the lower insulation member toward the outer surface of the lower insulation member.

10. An insulation system in accordance with claim 9 wherein the first radial relief cut extends axially along the entire length of the upper insulation member and wherein the second radial relief cut extends axially along the entire length of the lower insulation member.

11. An insulation system in accordance with claim 10 wherein the first radial relief cut is located at the center portion of the upper insulation member and the second radial relief cut is located at the center portion of the lower insulation member.

12. An insulation system in accordance with claim 11 comprising:

a third and a fourth radial relief cut extending from the inner surface of the upper insulation member to the outer surface of the upper insulation member; and a fifth and a sixth radial relief cut extending from the inner surface of the lower insulation member to the outer surface of the lower insulation member.

13. An insulation system in accordance with claim 12 wherein the third and fourth radial relief cuts are equidistant from the first radial relief cut and wherein the fifth and sixth radial relief cuts are equidistant from the second radial relief cut.

14. A thermal insulation system for insulating a pipe, comprising:

an arc-shaped upper insulation member having an inner surface, a first end, a second end and a center portion located between the first end and the second end;

an arc-shaped lower insulation member having an inner surface, a first end, a second end, and a center portion located between the first end and the second end, the first end of the lower insulation member engageable with the first end of the upper insulation member forming a first shiplap joint, and the second end of the lower insulation member engageable with the second end of the upper insulation member forming a second shiplap joint, wherein the upper and lower insulation members collectively surround the pipe when installed thereon;

at least one relief cut in one of the upper and lower insulation members; and wherein the radii of curvature of the inner surfaces of the upper and lower insulation members are not constant.

15. An insulation system in accordance with claim 14 comprising a radius of curvature at the shiplap joints, Re, and a radius of curvature at the center portions of upper and lower insulation members, Rc, wherein the radius of curvature at the center portions, Rc, is greater than the radius of curvature at the shiplap joints, Re.

16. An insulation system in accordance with claim 15 wherein, when the insulation system is installed on the pipe, a gap is defined between the inner surface of the upper insulation member and the pipe, and between the inner surface of the lower insulation member and the pipe.

17. An insulation system for insulating a pipe, comprising:

an upper insulation member having an inner surface, an outer surface, a first edge extending axially along a length of the upper insulation member, a second edge extending parallel to the first edge, and a center portion located on the upper insulation member between the first edge and the second edge;

a lower insulation member having an inner surface, an outer surface, a first edge extending axially along a length of the lower insulation member, a second edge extending parallel to the first edge of the lower insulation member, and a center portion located on the lower insulation member between the first edge and the second edge, wherein the upper and lower insulation member cooperate to wrap around the pipe when installed thereon;

a first pair of constant radius relief cuts extending radially from the first edge of the upper insulation member toward the center portion of the upper insulation member;

a second pair of constant radius relief cuts extending radially from the first edge of the lower insulation member toward the center portion of the lower insulation member;

a third pair of constant radius relief cuts extending radially from the second edge of the lower insulation member toward the center portion of lower insulation member; and a fourth pair of constant radius relief cuts extending radially from the second edge of the upper insulation member toward the center portion of the upper insulation member.

18. An insulation system in accordance with claim 17, further comprising:

a first radial relief cut extending radially from the inner surface of the upper insulation member toward the outer surface of the upper insulation member; and a second radial relief cut extending radially from the inner surface of the lower insulation member toward the outer surface of the lower insulation member.

19. An insulation system in accordance with claim 18 wherein the radius of curvature at the first edge and the second edge of the upper and lower insulation members is smaller than the radius of curvature at the center portions of the upper and lower insulation members.

20. An insulation system in accordance with claim 19, further comprising a jacket surrounding the upper and lower insulation members.

\* \* \* \* \*

UNITED STATES PATENT AND TRADEMARK OFFICE
CERTIFICATE OF CORRECTION

PATENT NO. : 6,403,182 B1
DATED : June 11, 2002
INVENTOR(S) : Sean Plummer and John King It is certified that error appears in the above-identified patent and that said Letters Patent is hereby corrected as shown below:

<u>Title page,</u>
Item [57], ABSTRACT,
Line 4, replace "have" with -- has --.

<u>Column 7,</u>
Line 3, replace "relief cut" with -- relief cuts --.

<u>Column 8,</u>
Line 38, after "wherein" delete the comma.

<u>Column 9,</u>
Line 3, after "portion of" insert -- the --.

Signed and Sealed this

Fourth Day of March, 2003

JAMES E. ROGAN
*Director of the United States Patent and Trademark Office*